(12) United States Patent
Sebright et al.

(10) Patent No.: US 11,247,916 B2
(45) Date of Patent: Feb. 15, 2022

(54) WASTE SEPARATION SYSTEM

(71) Applicant: Sebright Products, Inc., Hopkins, MI (US)

(72) Inventors: Stuart Lee Sebright, Allegan, MI (US); Dean Daniel Banas, Wayland, MI (US); Benjamin Warren Dietz, Allegan, MI (US); Douglas Gene Sebright, Allegan, MI (US)

(73) Assignee: Sebright Products, Inc., Hopkins, MI (US)

( * ) Notice: Subject to any disclaimer, the term of this patent is extended or adjusted under 35 U.S.C. 154(b) by 119 days.

(21) Appl. No.: 16/442,456

(22) Filed: Jun. 15, 2019

(65) Prior Publication Data
US 2019/0382285 A1 Dec. 19, 2019

Related U.S. Application Data

(60) Provisional application No. 62/685,492, filed on Jun. 15, 2018.

(51) Int. Cl.
*C02F 1/26* (2006.01)
*C02F 1/00* (2006.01)
*B02C 23/10* (2006.01)
*C02F 103/02* (2006.01)

(52) U.S. Cl.
CPC .............. *C02F 1/26* (2013.01); *B02C 23/10* (2013.01); *C02F 1/004* (2013.01); *C02F 1/006* (2013.01); *C02F 2103/02* (2013.01); *C02F 2201/005* (2013.01); *C02F 2209/01* (2013.01); *C02F 2209/02* (2013.01); *C02F 2209/03* (2013.01); *C02F 2209/06* (2013.01); *C02F 2209/08* (2013.01); *C02F 2209/29* (2013.01); *C02F 2209/36* (2013.01); *C02F 2209/42* (2013.01); *C02F 2301/046* (2013.01); *C02F 2303/24* (2013.01)

(58) Field of Classification Search
None
See application file for complete search history.

(56) References Cited

U.S. PATENT DOCUMENTS

| 2012/0199220 | A1* | 8/2012 | Knepp | C02F 9/005 137/558 |
| 2013/0306572 | A1* | 11/2013 | Potts | E03F 1/006 210/747.9 |
| 2016/0362307 | A1* | 12/2016 | Shiner | B01D 1/305 |

* cited by examiner

*Primary Examiner* — Richard C Gurtowski
(74) *Attorney, Agent, or Firm* — McGarry Bair PC

(57) ABSTRACT

The disclosure relates to a system for separating waste. The waste separating system includes a compacting assembly, a liquid diverting assembly, and a controller configured to control aspects of the compacting assembly and the liquid diverting assembly. The waste separating system can divert waste liquid from a manufacturing assembly to a liquid diverting assembly, where a controller is configured to selectively control a flow of the waste liquid to a drain or to a storage tank.

16 Claims, 3 Drawing Sheets

WASTE SEPARATION SYSTEM

CROSS REFERENCE TO RELATED APPLICATIONS

This application claims the benefit of U.S. application No. 62/685,492 filed Jun. 15, 2018, which is incorporated herein in its entirety.

BACKGROUND

Cardboard, aluminum, and plastic are some examples of solid waste materials. Solid waste materials can be placed in a compactor for compacting prior to transport to a recycling or other solid waste disposal facility. This process becomes complicated when the solid waste materials contain a liquid that must be separated from the solid waste material during the disposal process. The liquid waste, once separated, can be pumped into a tank for disposal. Alternatively, some facilities dispose of liquid waste using a sewer system. Depending on the contents of the liquid waste, additional disposal fees may be required. In a non-limiting example, liquid waste with a high sugar content often requires additional fees when disposed of using a sewer system.

BRIEF DESCRIPTION

In one aspect, the present disclosure relates to a system for separating waste. The waste separating system includes a compacting assembly, a liquid diverting assembly, and a controller configured to control aspects of the compacting assembly and the liquid diverting assembly.

Another aspect of the present disclosure relates to a system for separating liquids. The liquid separation system includes a manufacturing assembly, a liquid diverting assembly, and a controller configured to control aspects of the manufacturing assembly and the liquid diverting assembly.

Still another aspect of the present disclosure relates to a method for separating waste. The method can begin with by redirecting or extracting a liquid waste. The liquid waste is pumped into a liquid diverting assembly that includes one or more sensors or meters. A measurement is obtained from the one or more sensors or meters and communicated with a controller. The controller compares the measurement to at least one preset value and determines, based on the comparison, the position of a valve.

DESCRIPTION

Figure 1:
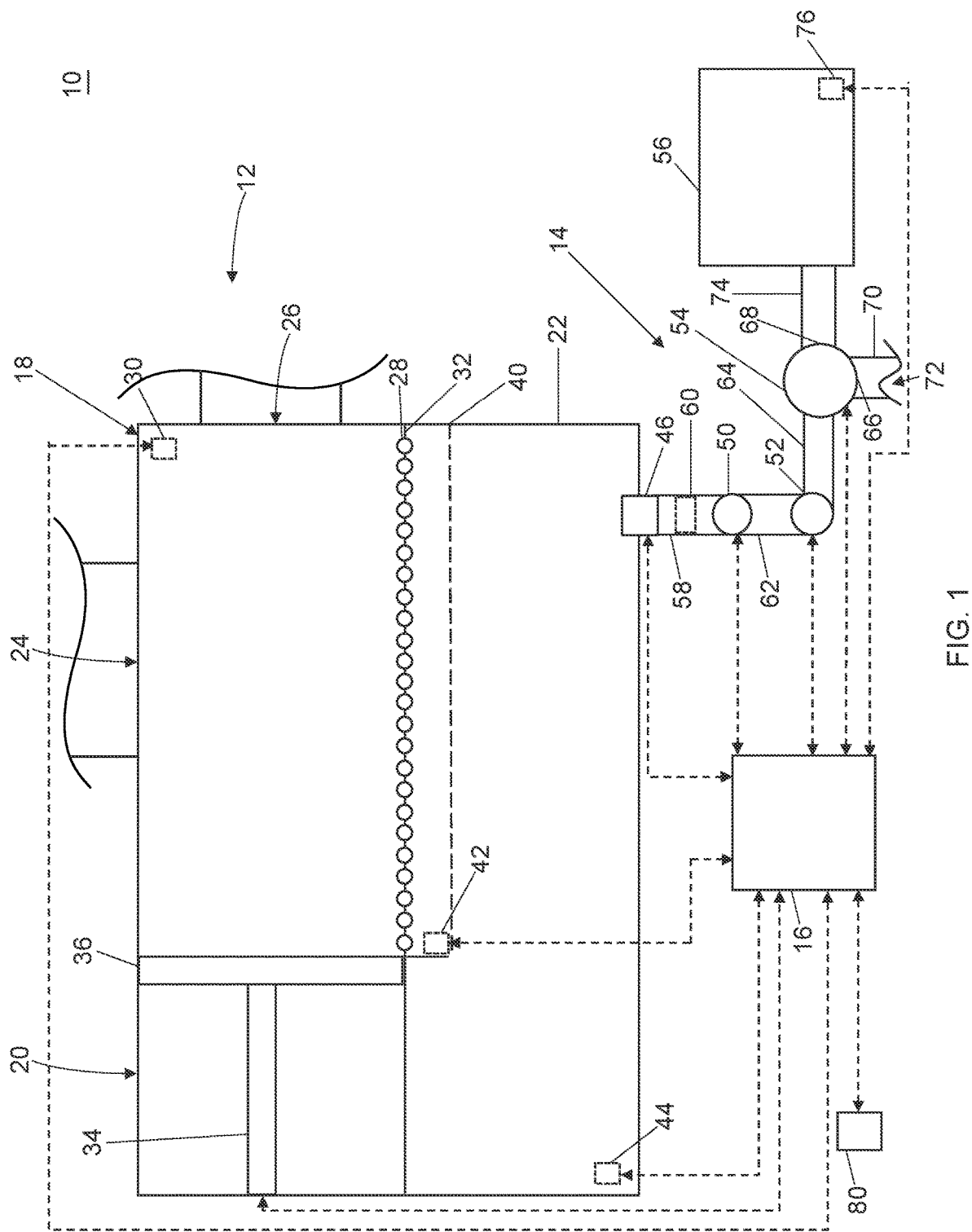
FIG. 1 is a schematic, cross-sectional side view of a waste separating system according to aspects of the disclosure.

Herein, unless otherwise noted, the term "waste" applies to a material intended for disposal or recycling. Waste can include solid or liquid portions, referred to as "solid waste" or "liquid waste." In a non-limiting example, an expired can of juice would be considered waste; where the juice would be the liquid waste and the can that holds the juice would be considered solid waste.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, mounted, connected, fixed, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

As illustrated in FIG. 1, a system 10 includes, at a minimum, a compacting assembly 12, a liquid diverting assembly 14, and a controller 16. The compacting assembly 12 can include a compression chamber 18, a compression assembly 20, and a liquid waste tank 22. The liquid diverting assembly 14 can include a pump 50, at least one waste fluid sensor 52, a multi-directional valve 54, and a storage tank 56.

The compression chamber 18 can include an inlet 24, an outlet 26, liquid waste ports 28, and at least one sensor 30. The inlet 24 is at a location where waste enters the compression chamber 18. The inlet 24 can include a chute or other means by which the inlet 24 can couple the compression chamber 18 to a piercing assembly, a hopper, or a conveyor belt (not shown).

The outlet 26 can be any closable barrier that, when open, allows solid waste to be removed from the compression chamber 18. Optionally, in a non-limiting example, the outlet 26 can couple the compression chamber 18 to a platform, discharge chute, or conveyor belt for further handling of the solid waste.

The liquid waste ports 28 can be located on a bottom portion 32 of the compression chamber 18. Additionally, liquid waste ports 28 can be located on any wall or surface of the compression chamber 18. The liquid waste ports 28 can allow liquid waste to leave the compression chamber 18. The liquid waste ports 28 can be, but are not limited to, holes with an inner diameter of 0.25 inches.

The compression chamber 18 can include at least one sensor 30. The at least one sensor 30 communicates with the controller 16. Communication with the controller 16 can be, but is not limited to, electrical signal, optical signal, sonic signal, electromagnetic signal, any other wireless signal processes, induction, or user input of data read from the at least one sensor 30. The at least one sensor 30 can be a series of sensors that can detect either the same or different aspects of the waste placed in the compression chamber 18. By way of non-limiting examples, the at least one sensor 30 can be a weight sensor or a force sensor.

The compression assembly 20 couples to the compression chamber 18 and can include a hydraulic cylinder 34 and a ram 36 for the compression of waste in the compression chamber 18. Alternatively, the compression assembly 20 can be any known method for compressing waste in a chamber. The compression assembly 20 communicates with the controller 16. Communication with the controller 16 can be, but is not limited to, electrical signal, optical signal, sonic signal, electromagnetic signal, any other wireless signal processes, or induction. The controller 16 can use information from the at least one sensor 30 to control the compression assembly 20. Further, the compression assembly 20 can include various sensors (not shown) coupled to the controller 16 for further control.

The liquid waste tank 22 is fluidly coupled to the compression chamber 18 to gather waste fluid. By way of non-limiting example, the liquid waste tank 22 can be located beneath the compression chamber 18, but other locations are contemplated. It is further contemplated that any combination of pans, conduits, angled surfaces, or other known methods for transporting fluid can be used to fluidly connect the compression chamber 18 and the liquid waste tank 22. The liquid waste tank 22 can include a first filter 40 for collecting solid waste that pass through the liquid waste ports 28. The first filter 40 can include a first filter sensor 42 that communicates with the controller 16. By way of non-limiting examples, the first filter sensor 42 can be a weight sensor or a force sensor.

The liquid waste tank 22 can include at least one tank sensor 44 that communicates with the controller 16. The at least one tank sensor 44 can be a liquid level sensor, an optical sensor, a pH sensor, a pressure sensor, a temperature sensor, or a flow meter, by way of non-limiting examples.

The liquid waste tank 22 has an exit 46. The exit 46 can include an exit valve that can be controlled by the controller 16. The exit 46 couples the liquid waste tank 22 to the liquid diverting assembly 14. It is also contemplated that the liquid waste tank 22 is a system that includes more than one fluidly connected tanks or storage containers.

A first connecting conduit 58 fluidly couples the pump 50 to the liquid waste tank 22. The pump 50 is controlled by the controller 16. The first connecting conduit 58 can include any number of conduits, connectors, or adaptors and is not limited to a single piece. The first connecting conduit 58 can also include a second filter 60. By way of non-limiting example, the second filter 60 can be a removable basket filter.

A second connecting conduit 62 fluidly connects the pump 50 to at least one waste liquid sensor 52. The second connecting conduit 62 can include any number of conduits, connectors, or adaptors and is not limited to a single piece. The at least one waste liquid sensor 52 communicates with the controller 16. By way of a non-limiting example, the at least one waste liquid sensor 52 can include a flow-meter, a BRIX meter or other refractometer, a hydrometer, a temperature sensor, or a pressure sensor.

A third connecting conduit 64 fluidly couples the at least one waste liquid sensor 52 to a multi-directional valve 54. The third connecting conduit 64 can include any number of conduits, connectors, or adaptors and is not limited to a single piece. The multi-directional valve 54 is controlled by the controller 16. The multi-directional valve 54 is illustrated as a 3-way valve having a first output 66 and a second output 68, however, the multi-directional valve 54 is not limited to two output possibilities.

When the controller 16 opens the first output 66, the multi-directional valve 54 fluidly couples the third connecting conduit 64 to a drain conduit 70 that couples to a drain 72. The drain 72 can be, but is not limited to, a sewer or a storage tank intended for disposal.

Alternatively, when the controller 16 opens the second output 68, the multi-directional valve 54 fluidly couples the third connecting conduit 64 to a tank conduit 74 that couples to the storage tank 56. The storage tank 56 can include at least one storage tank sensor 76. The at least one storage tank sensor 76 communicates with the controller 16. By way of non-limiting examples, the at least one storage tank sensor 76 can include a liquid level sensor, an optical sensor, a pH sensor, a pressure sensor, a temperature sensor, or a flow meter.

In operation, by non-limiting example, waste is loaded into the compression chamber 18 through an inlet 24. The at least one sensor 30 can communicate to the controller 16 when the compression chamber 18 is full. It is contemplated that the controller 16 can be multiple controllers in communication with each other. The controller 16 can then activate the compression assembly 20 in which the ram 36 is driven by the hydraulic cylinder 34 for the compression of waste in the compression chamber 18. Optionally, an additional at least one sensor 30 can communicate to the controller 16 when the appropriate amount of force has been applied to the waste in the compression chamber 18.

The liquid waste flows through at least the bottom portion 32 of the compression chamber 18 through the liquid waste ports 28. The solid waste is now compressed and can be removed from the compression chamber 18 through the outlet 26.

A user interface 80 can commutate with the controller 16 for the communication or input of information between the system 10 and the user. Non-limiting examples of the user interface 80 can include one or more of: a mobile device, a touch screen, a keyboard, a monitor, a light emitting diode or other light source, a speaker, or a microphone.

The predominantly liquid waste, once it flows through the liquid waste ports 28, can then flow through the first filter 40 to remove small solid waste material that may have passed through the liquid waste ports 28. Optionally, the first filter 40 can include the first filter sensor 42 which can, for example, communicate to the controller 16 that the first filter 40 is full.

After flowing through the first filter 40, the liquid waste enters the liquid waste tank 22. The liquid waste tank 22 can include at least one tank sensor 44. By way of non-limiting example, the at least one tank sensor 44 can communicate to the controller 16 when the liquid waste in the liquid waste tank 22 reaches a certain level. The controller 16 can activate the pump 50. The liquid waste can then flow from the liquid waste tank 22 out the exit 46 and through the first connecting conduit 58. The first connecting conduit 58 can include the second filter 60.

The liquid waste is then pumped through the second connecting conduit 62 and through at least one waste liquid sensor 52. By way of non-limiting example the at least one waste liquid sensor 52 can be a flow-meter and a BRIX refractometer. The at least one waste liquid sensor 52 communicates with the controller 16. The measurements taken by the at least one waste liquid sensor 52 can help determine the position of the multi-direction valve. For example, if the liquid waste has a sugar content at or below a preset value, the controller 16 can open the first output 66, allowing the liquid waste to flow through the drain conduit 70 and into the drain 72. The drain 72 can be a sewer system.

Alternatively, for example, if the liquid waste has a sugar content detected by the at least one liquid waste sensor 52 to be above a preset value, the controller 16 can open the second output 68, allowing the liquid waste to flow through the tank conduit 70 and into the storage tank 56.

Figure 2:
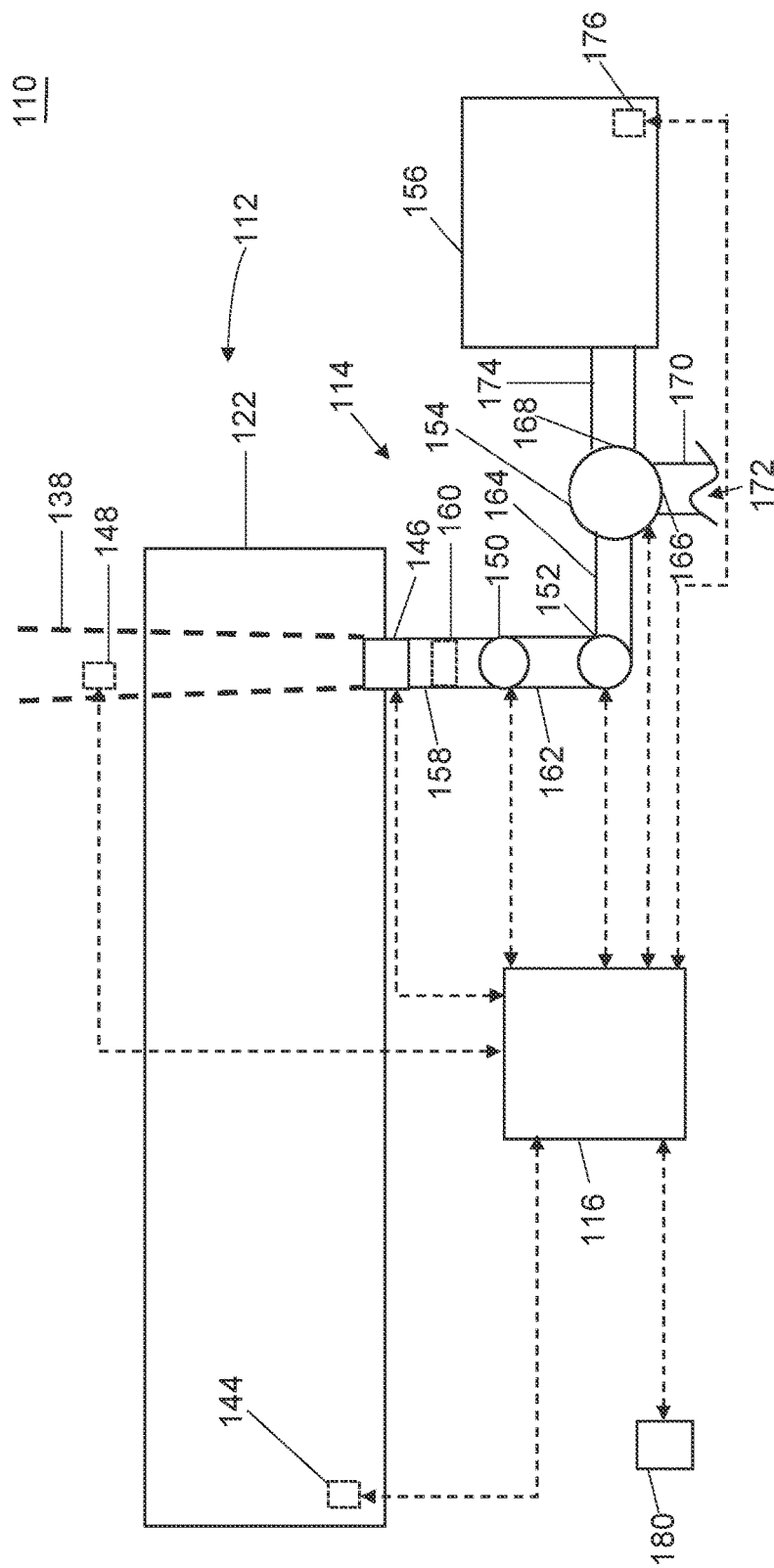
FIG. 2 is a schematic, cross-sectional side view of a waste separating system according to another aspect of the disclosure.

FIG. 2 illustrates another aspect of the present disclosure as it relates to a system for separating liquids. The liquid separation system 110 includes a manufacturing assembly 112, a liquid diverting assembly 114, and a controller 116 configured to control aspects of the manufacturing assembly 112 and the liquid diverting assembly 114.

The manufacturing assembly 112 can include a liquid waste tank 122 or a liquid waste conduit 138. The liquid waste in the liquid waste tank 122 or the liquid waste conduit 138 is the liquid waste from a manufacturing process, such as, but not limited to, bottling or canning. The liquid waste tank 122 can include at least one tank sensor 144 that communicates with the controller 116. The at least one tank sensor 144 can be a liquid level sensor, an optical sensor, a pH sensor, a pressure sensor, a temperature sensor, or a flow meter, by way of non-limiting examples.

Additionally or alternatively, the liquid waste conduit 138 can include a sensor 148 that can be a liquid level sensor, an optical sensor, a pH sensor, a pressure sensor, a temperature sensor, or a flow meter, by way of non-limiting examples.

The liquid waste tank 122 or the liquid waste conduit 138 can couple to an exit 146. The exit 146 couples the liquid waste tank 122 to the liquid diverting assembly 114. The exit 146 can be, by way of non-limiting example, an exit valve that can be controlled by the controller 116.

Aspects of the liquid diverting assembly 114 are similar to the liquid diverting assembly 14. Therefore, like parts will be identified with like numerals increased by 100, with it being understood that the description of the like parts of the liquid diverting assembly 14 apply to the liquid diverting assembly 114 unless otherwise noted.

In operation, by way of non-limiting example, when bottling one type of liquid and the manufacturing line must switch to another type of liquid, there is a transition period in which the liquid output by the automated line is considered liquid waste by the controller 116. This liquid waste during the transition of a manufacturing process can be placed in the liquid waste tank 122 or flow through the liquid waste conduit 138. The at least one tank sensor 144 or the sensor 148 communicates with the controller 116 to release the liquid waste through the exit 146 into the liquid diverting assembly 114. The liquid diverting assembly 114 functions similarly to that previously describe as the liquid diverting assembly 14 to appropriately divert the liquid waste based on measurements taken by the at least one waste liquid sensor 152.

Figure 3:
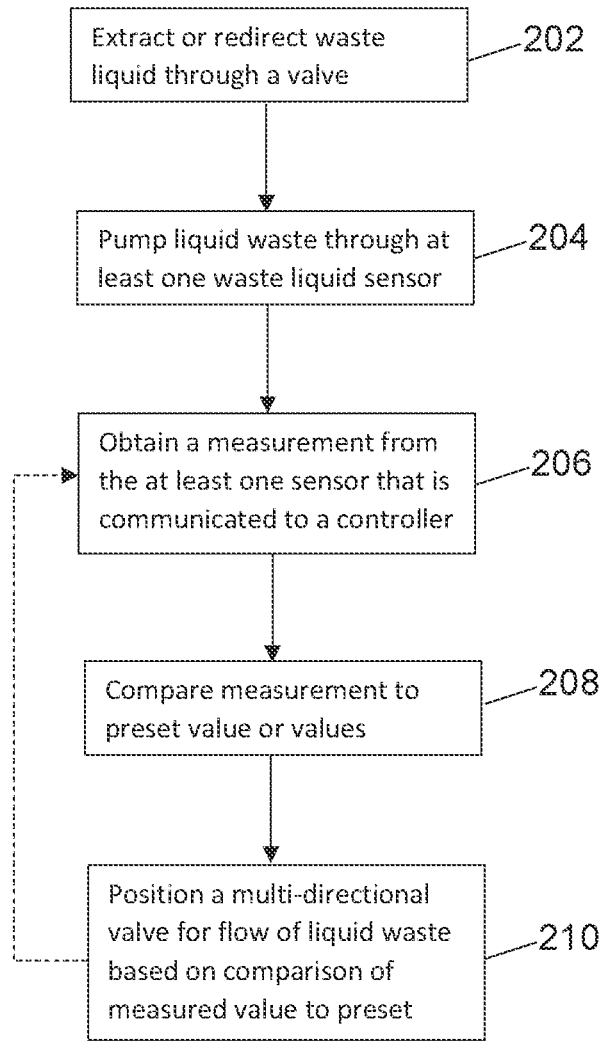
FIG. 3 is a flow chart showing a method for method for separating waste.

FIG. 3 is a flow chart showing a method 200 for separating waste. At 202, waste liquid is extracted by the compacting assembly 12 or redirected by the manufacturing assembly 112. Optionally, a controller 16, 116 can open valves at the exit 46, 146. At 204 the liquid waste is pumped into the liquid diverting assembly 14, 114 that includes at least one waste liquid sensor 52, 152. At 206 the at least one waste liquid sensor 52, 152 communicates at least one measurement with the controller 16, 116. At 208 the controller 16, 116 compares the at least one measurement from the at least one waste liquid sensor 52, 152. Based on the comparison in 208, at 210 the multi-directional valve 54, 154 is positioned. The liquid waste flows through the multi-directional valve to an appropriate location based on the at least one measurement from the at least one waste liquid sensor 52, 152. Based on the controller 16, 116, after 210 the method can cycle back to 206 and continue to take measurements that control the multi-directional valve 54, 154.

Non-limiting examples of possible measurements taken at 206 by the at least one waste liquid sensor 52, 152 and communicated to the controller 16, 116 include a biochemical oxygen demand (BOD) level or analysis, a sugar level (BRIX) value, a relative density of the fluid, a fluid spectrum analysis, a pH level, an amount of oil in water, a bacteria level, a lead level, a presence of level of pesticide, a nitrites/nitrates level, or a chlorine level.

Additionally or alternatively after 210, the waste liquid can flow through additional waste liquid sensors and can be further separated based on measurements taken by the additional waste liquid sensors. The separating process can continue through a variety of sensors and multi-directional valves.

Benefits of the present invention include a decrease in certain types of liquid waste to be discharged to the sewer system. For example, liquid waste with a high enough sugar content has a high biological oxygen demand and can be expensive to treat. However, that same liquid waste with a high enough sugar content can be used in the production of ethanol. The waste separation and liquid separation systems illustrated in the present disclosure demonstrate systems that can separate liquid waste based on preset values into liquid waste that is suitable for sewer disposal and liquid waste that can used for another purpose.

To the extent not already described, the different features and structures of the present disclosure can be used in combination with each other as desired. For example, one or more of the sensors illustrated and/or described with respect to the system 10 can be used to sense one or more of the measurements discussed herein. That one feature may not be illustrated in all the embodiments and is not meant to be construed that it cannot be, but is done for brevity of description. Thus, the various features of the different embodiments can be mixed and matched as desired to form new embodiments, whether or not the new embodiments are expressly described.

While aspects of the present disclosure have been specifically described in connection with certain specific embodiments thereof, it is to be understood that this is by way of illustration and not of limitation. Reasonable variation and modification are possible within the scope of the forgoing disclosure and drawings without departing from the spirit of the present disclosure which is defined in the appended claims.

What is claimed is:

1. A waste separating system comprising:
   a compression chamber that receives solid waste and liquid waste,
   a liquid waste tank or a liquid waste conduit having an exit valve, wherein the liquid waste tank or the liquid waste conduit is fluidly coupled to the compression chamber for receiving at least a portion of the liquid waste from the compression chamber,
   at least one fluid sensor in the liquid waste tank or the liquid waste conduit configured to measure an amount of liquid in the liquid waste tank or the liquid waste conduit,
   a liquid diverting assembly in fluid communication with the exit valve of the liquid waste tank or the liquid waste conduit, the liquid diverting assembly including a pump, at least one waste liquid sensor, and a multi-directional valve, and
   a controller connected to the exit valve, the least one fluid sensor, the least one waste liquid sensor, and the multi-directional valve,
   wherein the controller is configured to actuate the exit valve and the pump and to position the multi-directional valve based on measurements from the least one fluid sensor and the least one waste liquid sensor.

2. The waste separating system of claim 1 further comprising a compacting assembly including the compression chamber and a compression assembly wherein the liquid waste tank or the liquid waste conduit is part of the compacting assembly and the compression assembly is connected to the controller.

3. The waste separating system of claim 2 further comprising a waste sensor in the compression chamber connected to the controller, wherein the controller is further configured to operate the compression assembly based on data from the waste sensor.

4. The waste separating system of claim 2 wherein the compression chamber is in fluid communication with the liquid waste tank or the liquid waste conduit by way of liquid waste ports.

5. The waste separating system of claim 1 further comprising a filter in one of a liquid waste tank or a liquid waste conduit.

6. The waste separating system of claim 1 wherein the multi-directional valve is a three position valve operable between a closed position, a first position where the multi-directional valve is in fluid communication with a drain, and a second position where the multi-directional valve is in fluid communication with a storage tank.

7. The waste separating system of claim 6 further comprising at least one storage tank sensor in the storage tank connected to the controller wherein the controller is further configured to operate the liquid diverting assembly based on data from the at least one storage tank sensor.

8. The waste separating system of claim 7 wherein the at least one storage tank sensor is one of a liquid level sensor, an optical sensor, a pH sensor, a pressure sensor, a temperature sensor, or a flow meter.

9. The waste separating system of claim 1 wherein the least one fluid sensor is one of a liquid level sensor, an optical sensor, a pH sensor, a pressure sensor, a temperature sensor, or a flow meter.

10. The waste separating system of claim 1 wherein the least one waste liquid sensor is one of a flow-meter, a BRIX meter or other refractometer, a hydrometer, a temperature sensor, or a pressure sensor.

11. A method of separating liquid waste comprising;
compressing in a compression chamber solid waste and liquid waste,
directing the liquid waste to at least one of a liquid waste tank or a liquid waste conduit,
opening an exit valve to direct the liquid waste from the at least one of the liquid waste tank or the liquid waste conduit to a liquid diverting assembly in fluid communication with the exit valve,
measuring a value of the liquid waste by at least one liquid waste sensor in the liquid diverting assembly, wherein the at least one liquid waste sensor is downstream of the exit valve,
comparing in a controller at least one measurement from the liquid waste sensor to a preset value, and
positioning a multi-directional valve, in the liquid diverting assembly downstream of the at least one liquid waste sensor, based on the comparison wherein liquid waste is directed to flow to one of a drain or a storage tank.

12. The method of claim 11 further comprising repeating the comparing and positioning steps.

13. The method of claim 11 wherein the measuring step includes obtaining at least one of biochemical oxygen demand (BOD) level, a sugar level (BRIX), a relative density of the liquid waste, a fluid spectrum analysis, a pH level, an amount of oil in water, a bacteria level, a lead level, a presence of level of pesticide, a nitrites/nitrates level, or a chlorine level.

14. The method of claim 11 further comprising positioning more than one multi-directional valve and wherein the at least one liquid waste sensor is configured to measure more than one parameter of the liquid waste.

15. The waste separating system of claim 5 further comprising a filter sensor associated with the filter wherein the filter sensor is connected to the controller.

16. The waste separating system of claim 5 further comprising a second filter between the exit valve and the pump.

* * * * *

UNITED STATES PATENT AND TRADEMARK OFFICE
CERTIFICATE OF CORRECTION

| | |
|---|---|
| PATENT NO. | : 11,247,916 B2 |
| APPLICATION NO. | : 16/442456 |
| DATED | : February 15, 2022 |
| INVENTOR(S) | : Sebright et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 212 days.

Signed and Sealed this
Twenty-ninth Day of November, 2022

Katherine Kelly Vidal
*Director of the United States Patent and Trademark Office*